United States Patent
Matsuno et al.

(10) Patent No.: US 9,902,082 B2
(45) Date of Patent: Feb. 27, 2018

(54) VEHICULAR INTERIOR MEMBER MANUFACTURING METHOD AND AIRBAG RUPTURING GROOVE MANUFACTURING METHOD

(71) Applicants: NAKATA COATING CO., LTD., Yokohama-shi, Kanagawa (JP); HONDA MOTOR CO., LTD., Minato-ku, Tokyo (JP)

(72) Inventors: Takemi Matsuno, Kanagawa (JP); Hisashi Masuda, Tokyo (JP); Takaaki Nagata, Tokyo (JP)

(73) Assignees: NAKATA COATING CO., LTD., Yokohama-Shi (JP); HONDA MOTOR CO., LTD., Minato-Ku, Tokyo (JP)

( * ) Notice: Subject to any disclaimer, the term of this patent is extended or adjusted under 35 U.S.C. 154(b) by 539 days.

(21) Appl. No.: 14/533,479

(22) Filed: Nov. 5, 2014

(65) Prior Publication Data

US 2015/0059143 A1 Mar. 5, 2015

Related U.S. Application Data

(63) Continuation-in-part of application No. 13/262,012, filed as application No. PCT/JP2009/057742 on Apr. 7, 2009, now abandoned.

(51) Int. Cl.
*B26D 7/08* (2006.01)
*B26D 3/08* (2006.01)
(Continued)

(52) U.S. Cl.
CPC ............... *B26D 7/086* (2013.01); *B26D 3/08* (2013.01); *B26D 5/00* (2013.01); *B26D 5/06* (2013.01);
(Continued)

(58) Field of Classification Search
CPC ...... B26D 2210/00; B26D 3/08; B26D 5/007; B26D 5/06; B26D 5/086; B26D 3/085;
(Continued)

(56) References Cited

U.S. PATENT DOCUMENTS 4,738,605 A 4/1988 Aerts et al.
7,284,975 B2 10/2007 Morita
(Continued)

FOREIGN PATENT DOCUMENTS

JP 2003-133359 5/2003
JP 2004-39841 2/2004
(Continued)

*Primary Examiner* — Stella Yi
(74) *Attorney, Agent, or Firm* — Gerald E. Hespos; Michael J. Porco; Matthew T. Hespos

(57) ABSTRACT

Provided are a vehicular interior member manufacturing method and an airbag rupturing groove manufacturing method which can form an airbag rupturing groove excellent in invisibility even in a vehicular interior member having a hard substrate layer, while performing a proper control of the thickness of the remainder of the airbag rupturing groove to be formed. The vehicular interior member manufacturing method is characterized by protruding a metal blade having an edge flattened at least partially against a forming face of the rupturing groove, from a back side of the vehicular interior member and partially into the skin layer wherein a thickness of the skin layer into which the metal blade has not protruded corresponds to a remaining thickness of the skin layer, and confirming whether or not the metal blade is detected at a second detecting position while the metal blade is not detected at a first detecting position.

6 Claims, 15 Drawing Sheets

(51) Int. Cl.
*B26D 5/00* (2006.01)
*B26D 5/06* (2006.01)
*B26D 5/08* (2006.01)

(52) U.S. Cl.
CPC .......... *B26D 5/086* (2013.01); *B26D 2210/00* (2013.01); *Y10T 29/49771* (2015.01)

(58) Field of Classification Search
CPC ................ B29C 59/008; B29C 59/007; B60R 2021/21652
See application file for complete search history.

(56) References Cited

U.S. PATENT DOCUMENTS

| | | |
|---|---|---|
| 7,452,001 B2 | 11/2008 | Matsuno |
| 2002/0043144 A1 | 4/2002 | Reh et al. |
| 2005/0206068 A1 | 9/2005 | Sakaki et al. |
| 2006/0022436 A1 | 2/2006 | Morita |
| 2009/0243264 A1 | 10/2009 | Kaulbersch |

FOREIGN PATENT DOCUMENTS

| | | |
|---|---|---|
| JP | 2005-179056 | 7/2005 |
| JP | 2006-36148 | 2/2006 |
| JP | 2006-130470 | 5/2006 |
| JP | 2007-137088 | 6/2007 |
| JP | 2008-284653 | 11/2008 |
| WO | 2004/045921 | 6/2004 |
| WO | 2006/111212 | 10/2006 |

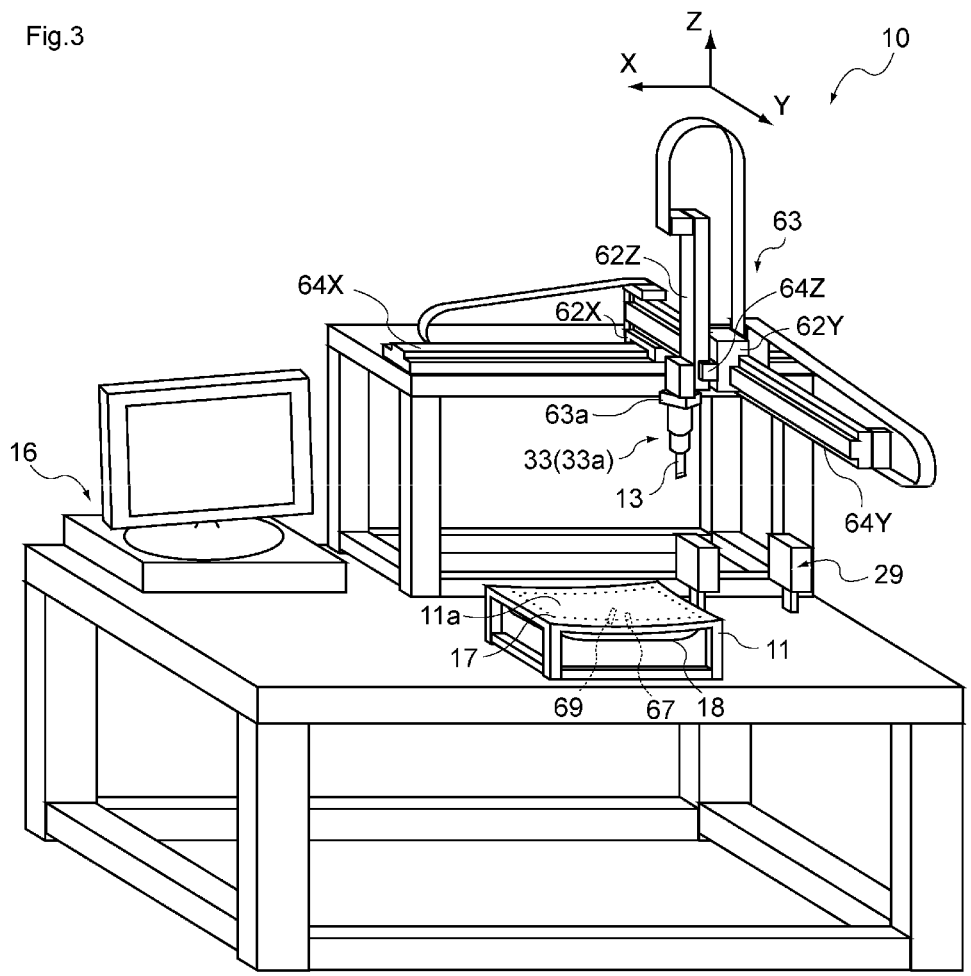

VEHICULAR INTERIOR MEMBER MANUFACTURING METHOD AND AIRBAG RUPTURING GROOVE MANUFACTURING METHOD

BACKGROUND OF THE INVENTION

1. Field of the Invention

The present invention relates to a vehicular interior member manufacturing method (a method of manufacturing a vehicular interior member) and an airbag rupturing groove manufacturing method (a method of manufacturing an airbag rupturing groove). More particularly, the present invention relates to a method of manufacturing an airbag rupturing groove which forms an airbag rupturing groove in a vehicular interior member having a hard substrate layer and a skin layer, and a method of manufacturing a vehicular interior member which includes a process for forming an airbag rupturing groove.

2. Description of Related Art

Conventionally, a vehicle is equipped with an airbag to decrease an impact for drivers and the like at the time of a collision. A vehicular interior member (hereinafter also simply referred to as 'an interior member') such as an instrument panel, a door panel and the like is provided with an airbag rupturing groove having a thin-wall portion in order that the interior member breaks and the airbag reliably inflates by the deployment force of an airbag. Also, when such airbag rupturing groove is formed, the interior member of an invisible type is used, in which the airbag rupturing groove is formed on the back side of the interior member. This is because it does not impair interior decorations of the vehicle, and the airbag rupturing groove is not easily recognized from the front surface side.

Here, if the width of the airbag rupturing groove is broad in forming the airbag rupturing groove on the back side of the interior member as the invisible type, it is possible that invisibility from an exterior surface decreases, owing to expansion and contraction of the skin with the time change. Therefore, there is a method for producing the airbag rupturing groove as narrow as possible by using a knife type cutter, an engraving knife and the like instead of using a heat fusion blade or an ultrasonic cutter.

Further, since whether not an interior member reliably deploys at the airbag deployment (collision) has great influence on the drivers' safety, it is requested that the remaining thickness of the skin layer after having formed the airbag rupturing groove is controlled with high precision. Therefore, the remaining thickness of the skin layer is measured after the airbag rupturing groove is formed. More concretely, since the airbag rupturing groove formed by the cutting blade is narrow in width as mentioned above, the remaining thickness is measured on the condition that the skin is bent and the airbag rupturing groove is opened (e.g., WO 2004/0045921A).

SUMMARY OF THE INVENTION

As for an interior member, there is an interior member provided with a skin layer made of a resin sheet with three-dimensional decoration such as embossing (texturing) or the like on an exterior surface of a hard substrate layer. There is also an interior member provided with a foam layer between a hard substrate layer and a skin layer. When an interior member having such structure is manufactured, there are cases that the airbag rupturing groove is formed after the interior member having multi-layer layered structure is formed as a matter of convenience. When the airbag rupturing groove is formed in the interior member having the hard substrate layer, it is not easy to cut with the cutting blade as mentioned above. Further, such blade edge is easy to be damaged. Consequently, it is necessary to use the cutting means which is possible to easily cut the hard substrate layer. As for such cutting means, a heat melting edge, an ultrasonic cutter, a laser cutter, an end mill, and a rotating saw blade and the like could be available.

However, in order to keep the good invisibility of the interior member viewed from an exterior surface for a long period of time, it is necessary that the width of the airbag rupturing groove formed in the skin layer is as narrow as possible. Consequently, the end mill, and the rotating saw blade could not be employed. Similarly, as for the laser cutter, since a remaining thickness depends on the exposure time by the laser cutter and the management of the remaining thickness is not easy, the laser cutter could not be employed either.

On the contrary, when the line width of a formed airbag rupturing groove is considered, it seems that the heat melting edge or the ultrasonic cutter is preferable since the blade in flat shape is suitable in those cases. However, there are problems that its work becomes inefficient and the blade edge is easily damaged as well, since its blade must be moved in order to form the airbag rupturing groove while keeping the blade protruded into the hard substrate layer. Further, since such interior member is provided with a hard substrate layer, and it is not easy to measure a remaining thickness on the condition that the skin is bent and the airbag rupturing groove is opened, it is necessary to keep the blade edge position for the heat melting edge or the ultrasonic cutter, when the airbag rupturing groove is formed.

Thus, the present inventors have keenly studied the above mentioned problems. They have discovered that when the airbag rupturing groove is formed in the vehicular interior member having the hard substrate layer and the skin layer, this problem could be solved by forming the airbag rupturing groove with protruding the metal blade in the vehicular interior member, with confirming a edge position of the metal blade by two metal blade detecting means, and they have invented the present invention like this. That is, the objective of the present invention is to provide a method of manufacturing a vehicular interior member and a method of manufacturing an airbag rupturing groove, by which the airbag rupturing groove could be formed with an excellent invisibility, even when the vehicular interior member having the hard substrate layer, by appropriately managing the remaining thickness of the airbag rupturing groove.

SUMMARY OF THE INVENTION

According to the present invention, an airbag rupturing groove forming apparatus which forms an airbag rupturing groove breaking at the time of the deployment of the airbag, in a vehicular interior member having a hard substrate layer and a skin layer to cover the exterior surface of the hard substrate layer is provided. The airbag rupturing groove forming apparatus comprises a support base on which the vehicular interior member is placed, a rupturing groove forming means by which the airbag rupturing groove is formed by protruding a metal blade having an edge flattened at least partially against the forming face of the rupturing groove, from the back side of the vehicular interior member, a first metal blade detecting means and a second metal blade detecting means by which the presence or absence of the metal blade is confirmed, respectively, at the detecting positions which are different in the thickness direction of the skin layer, while keeping the metal blade protruded into the vehicular interior member, and a blade edge position deciding unit which decides whether or not the metal blade is detected by the second metal blade detecting means while the metal blade is not detected by the first metal blade detecting means. Thus, the airbag rupturing groove forming apparatus of the present invention could solve the above problems.

The first metal blade detecting means preferably detects the metal blade at the detecting position corresponding to the minimum permissible value that is permitted as a remaining thin thickness of the airbag rupturing groove.

The second metal blade detecting means preferably detects the metal blade at the detecting position corresponding to the maximum permissible value that is permitted as a remaining thick thickness of the airbag rupturing groove.

The airbag rupturing groove preferably is a broken line and the rupturing groove forming means includes both a thickness orientation movement means by which the metal blade is protruded in a thickness direction of the interior member in order to form an airbag rupturing groove, and a planar orientation movement means by which the metal blade is moved along a plane direction of a forming face of the airbag rupturing groove, while keeping the metal blade set apart from the vehicular interior member.

The edge of the metal blade has preferably a similar plane shape to the plane pattern of the airbag rupturing groove to be formed, and the rupturing groove forming means includes the thickness orientation movement means by which the metal blade is protruded in a thickness direction of the interior member in order to form the airbag rupturing groove.

A blade edge position adjustment unit preferably adjusts the amount of a protrusion of the metal blade depending on a decision by the blade edge position deciding unit.

The first metal blade detecting means and the second metal blade detecting means preferably are arranged in the positions which overlap in the thickness direction with a form-scheduled line of an airbag rupturing groove formed in the vehicular interior member or its extended line.

The invention also relates to a manufacturing method of a vehicular interior member having a hard substrate layer and a skin layer to cover the exterior surface of the hard substrate layer, in which an airbag rupturing groove, breaking at the time of the deployment of the airbag, is formed, wherein an airbag rupturing groove is formed, by protruding a metal blade having an edge flattened at least partially against the forming face of the rupturing groove, from the back side of the vehicular interior member, and by confirming whether or not the metal blade is detected at the second detecting position while the metal blade is not detected at the first detecting position, among first detecting positions and second detecting positions, which are different in the thickness direction of the skin layer.

More concretely, the invention relates to a manufacturing method of a vehicular interior member having a hard substrate layer and a skin layer to cover the exterior surface of said hard substrate layer, in which an airbag rupturing groove, breaking at the time of the deployment of the airbag, is formed, wherein said airbag rupturing groove is formed by: protruding a metal blade having an edge flattened at least partially against a forming face of said rupturing groove, from a back side of said vehicular interior member and partially into said skin layer wherein a thickness of said skin layer into which said metal blade has not protruded corresponds to a remaining thickness of said skin layer, and confirming whether or not said metal blade is detected at a second detecting position while said metal blade is not detected at a first detecting position, wherein the first detecting position and the second detecting position are located at different positions in the thickness direction of said skin layer, the first detecting position corresponds to a minimum permissible value that is permitted as said remaining thickness of said skin layer, the second detecting position corresponds to a maximum permissible value that is permitted as said remaining thickness of said skin layer, and detections of said metal blade at the first detecting position and the second detecting position are performed by using an eddy-current displacement sensor.

The vehicular interior member manufacturing method preferably adjusts the height of a blade edge of the metal blade so that the metal blade is detected at the second detection position while the metal blade is not detected at the first detection position, when either the metal blade is not detected at the second detection position or the metal blade is detected at the first detection position.

The invention also relates to a method of manufacturing an airbag rupturing groove in a vehicle interior member having a hard substrate layer and a skin layer covering a surface the hard substrate, the method comprising the steps of: fixing the vehicle interior member to a placing table with the hard substrate layer facing away from the placing table; positioning a metal blade of a rupturing groove forming apparatus above the placing table, the blade having an edge that is positionable flat against the forming face of the airbag rupturing groove; protruding the edge of the metal blade through the hard substrate layer and partially into the skin layer with the edge of the metal blade flat against a forming face of the rupturing groove; using a first metal blade detector to detect whether the metal blade reaches a first detection depth corresponding to a minimum remaining thickness; using a second metal blade detector to detect whether the metal blade reaches a second detection depth corresponding to a maximum remaining thickness; continuing protrusion of the metal blade into the vehicle interior member at least until the second metal blade detector detects the metal blade; and retracting the metal blade after the second metal blade detector detects the metal blade, but before the first metal blade detector detects the metal blade, wherein said first metal blade detector and said second metal blade detector are an eddy-current displacement sensor.

According to the method of manufacturing the vehicular interior member and the method of manufacturing the airbag rupturing groove of the present invention, since the methods are constituted so that the airbag rupturing groove is formed by protruding the metal blade having an edge flattened against the forming face of the airbag rupturing groove, it is able to form the airbag rupturing groove having a narrow line width, and to keep the good invisibility for a long period of time. Also, since it is not necessary to move the metal blade after the metal blade is protruded into the hard substrate layer, this could avoid the decrease of the operating efficiency and the decrease of the damages to a blade edge, as well.

Also, since these methods have the first and the second metal blade detecting means and the blade edge position deciding unit, the edge position of the metal blade is appropriately managed. As a result, although even the airbag rupturing groove is narrow in line width, a remaining thickness of the formed airbag rupturing groove could be correctly managed. Therefore, although the vehicle interior member has the hard substrate layer, the present invention provides the method of manufacturing the vehicular interior member and the method of manufacturing the airbag rupturing groove in which the deployment of the airbag is not disturbed, and the obtainable invisibility becomes excellent.

Also, according to the vehicular interior member manufacturing method of the present invention, since the airbag rupturing groove is formed by protruding the metal blade into the interior member with confirming the blade edge position, it is enabled to form the airbag rupturing groove so that the remaining thickness is managed within a desired range and its good invisibility keeps for a long period of time. Therefore, it is able to efficiently manufacture the vehicular interior member having the airbag rupturing groove, which has the hard the substrate, in which the deployment of the airbag is not disturbed, and which has excellent invisibility as well.

BRIEF DESCRIPTION OF THE DRAWINGS

FIG. 3 is a perspective view showing the configuration of the airbag rupturing groove forming apparatus in the first embodiment of the present invention.

DETAILED DESCRIPTION OF THE PREFERRED EMBODIMENTS

The embodiment of the present invention or the airbag rupturing groove forming apparatus and the method for manufacturing the vehicular interior member will be specifically described in the following, with appropriately referring to figures. However, since the following embodiments just represent one aspect of the present invention, the following description should not limit the present invention, and an embodiment of the present invention is arbitrarily altered within the scope of the present invention.

Note that, among each figure, the same reference number represents the same portion, and description thereof will be appropriately omitted.

A vehicular interior member.

Figure 1:
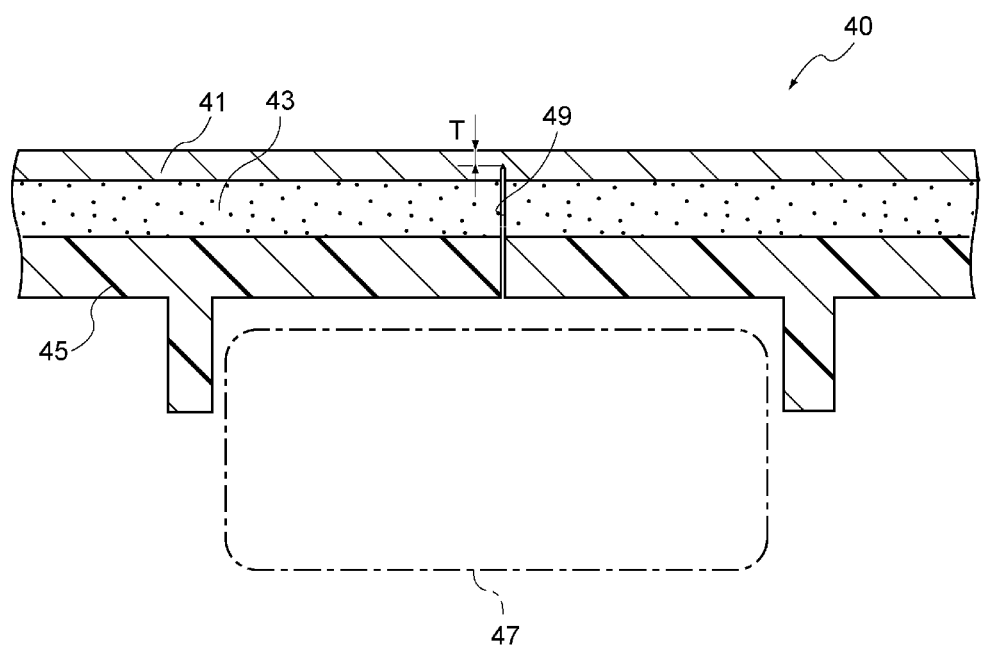
FIG. 1 is a sectional view of the vehicle interior member having the airbag rupturing groove formed using the airbag rupturing groove forming apparatus in the present invention.

At first, the structure of the vehicular interior member 40 having a formed airbag rupturing groove 49 which is an object of forming an airbag rupturing groove by the airbag rupturing groove forming apparatus of this embodiment will be described, with referring to FIG. 1. FIG. 1 shows a cross-sectional view of the position at which an airbag device 47 is accommodated in the vehicular interior member 40.

In this embodiment, a vehicular interior member 40, which is the object of forming an airbag rupturing groove, is the interior member 40 comprising a hard substrate layer 45, a skin layer 41 to cover the exterior of the hard substrate layer 45, and a foam layer 43 disposed between the hard substrate layer 45 and the skin layer 41. The vehicular interior member 40 constitutes an instrument panel or a door panel which contains an air bag device 47.

This interior member 40 is a molded article made of a resin material. The hard substrate layer 45 has large strength, retains a three-dimensional shape of the interior member 40, and has a mount for installing the air bag device 47. Also, the foam layer 43 is formed between the hard substrate layer 45 and the skin layer 41, and is comparatively soft. The foam layer 43 does not impede an airbag deployment, on one hand, it provides, on the other hand, pleasant touch and three-dimensional decorativeness. Also, the skin layer 41 in the interior member 40 has a decoration of a grain pattern (texture) or the like on its surface, and provides excellent feel of a material to an external appearance of an instrument panel or a door panel or the like.

As for the interior member 40 which is the object of forming the airbag rupturing groove 49 in the present invention, the hard substrate layer 45 takes a role of retaining its three-dimensional shape of the interior member 40, and its strength is enhanced accordingly. Consequently, strength of the hard substrate layer 45 is larger than that of the skin layer 41 or the foam layer 43. Therefore, when an airbag rupturing groove 49 is formed, the hard substrate layer 45 is hard to cut in comparison with the skin layer 41 or the foam layer 43.

Note, although examples of the interior member have three layer structure mentioned above, an interior member comprising only a hard substrate layer and a skin layer, which omitted a foam layer would be possible. Also, on the contrary, an interior member comprising a hard substrate layer, a skin layer and other layers including a foam layer and/or the like is possible.

Figure 2A:
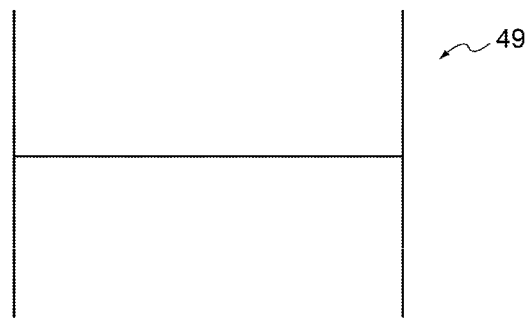
FIGS. 2A and 2B are examples showing plane patterns of the formed airbag rupturing groove.
Figure 2B:
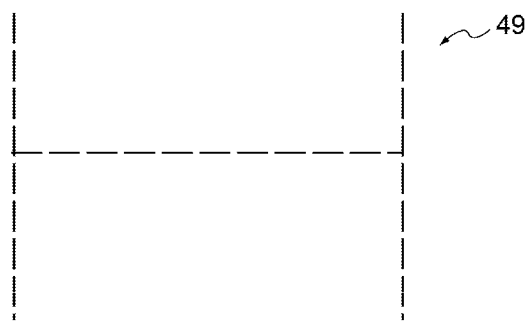

Also, the airbag rupturing groove 49 is formed from the back side of the interior member 40 as shown in FIG. 1. That is, since there is no airbag rupturing groove 49 on the exterior surface of the skin layer 41, its good invisibility of the interior member 40 is ensured. The airbag rupturing groove 49 is possible to be a solid line as shown in FIG. 2A, or it is possible to be a dotted line or a broken line as shown in FIG. 2B. In the case of an airbag rupturing groove forming apparatus in the first embodiment, the airbag rupturing groove forming apparatus is depicted as to constitute to forming an airbag rupturing groove of a broken line shape.

Also, in case of the interior member 40 having the hard substrate layer 45, it is necessary that the airbag rupturing groove is formed all over the parts ruptured at an airbag deployment time in the hard substrate layer 45. On the contrary, as for the soft skin layer 41, if there is a part to be formed, which became impetus to rupture at an airbag deployment time, it is possible to rupture from that part. Therefore, as for forming the airbag rupturing grooves 49, it could be required that only one part of a rupturing groove reaches to the skin layer 41. However, in case of a flat pattern of the airbag rupturing groove 49 as shown in FIG. 2, it is preferred that the airbag rupturing groove 49 to reach to the skin layer 41 is formed at least one for every span of a line.

Also, in the formed airbag rupturing grooves 49, it is preferred that a remaining thickness T until the external surface of the skin layer 41 is decided considering such as open-and-shut features of an airbag door, balance of invisibility, and mechanical strength or the like. It is preferred that T is a value within the range of 0.3 to 0.8 mm (millimeters). This is because when a remaining thickness of airbag rupturing grooves T is below 0.3 mm, there are cases that invisibility decreases and mechanical strength of the skin layer 41 significantly decreases. On the contrary, this is because when a remaining thickness of airbag rupturing grooves T is over 0.8 mm, there are cases that open-and-shut features significantly decrease.

Therefore, it is more preferred that a remaining thickness of airbag rupturing grooves T is a value within the range of 0.4 to 0.7 mm, and it is much more preferred that a remaining thickness T is a value within the range of 0.45 to 0.6 mm.

An airbag rupturing groove forming apparatus.

Next, an airbag rupturing groove forming apparatus which forms an airbag rupturing groove in a vehicular interior member as the first embodiment of the present invention will be described in detail.

Figure 4:
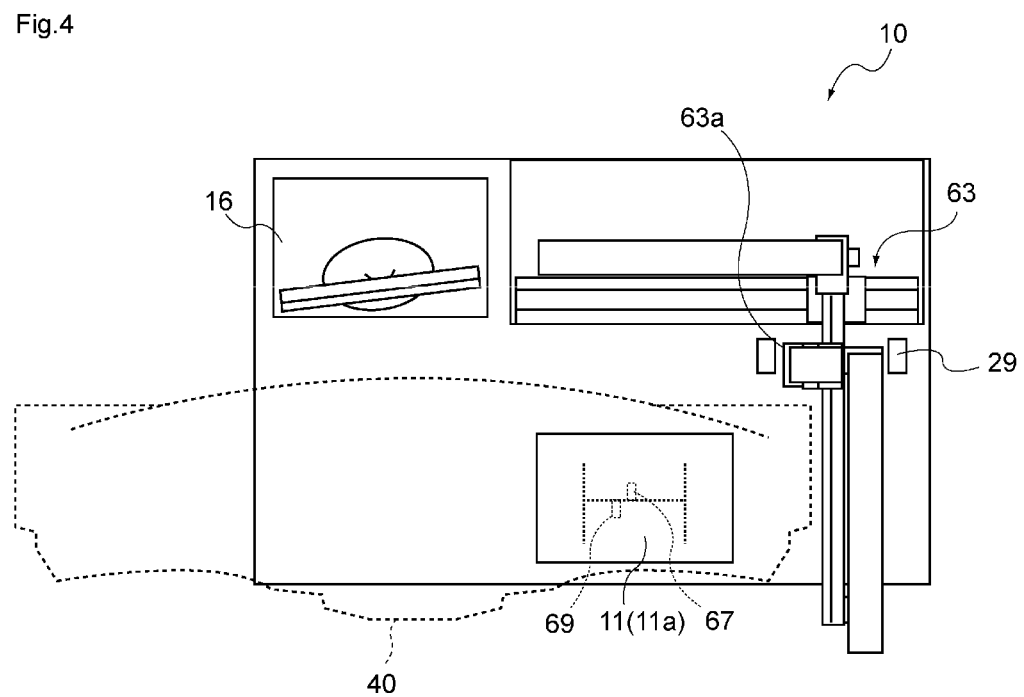
FIG. 4 is a top plan view showing structure of the airbag rupturing groove forming apparatus in the first embodiment of the present invention.

FIG. 3 shows a perspective view of a constitutional example of the airbag rupturing groove forming apparatus 10. Also, FIG. 4 is a plan view from the top of the airbag rupturing groove forming apparatus 10. In FIG. 4, the interior member 40 which is put on a support base is depicted with a broken line.

The airbag rupturing groove forming apparatus 10 mainly comprises the support base 11 on which the interior member 40 is put, the rupturing groove forming means 33 for forming the airbag rupturing groove in the interior member 40 placed on the support base 11, the first metal blade detecting means 67 and the second metal blade detecting means 69 which detect a position of a metal blade 13 constituting the rupturing groove forming means 33, and a controller 16 which controls movement of the airbag rupturing groove forming apparatus 10 and the like.

A support base.

The airbag rupturing groove forming apparatus 10 in this embodiment is provided with the support base 11 on which the interior member is put and fixed when the airbag rupturing groove is formed in the interior member. The interior member mentioned above has the hard substrate layer, and the interior member retains its three-dimensional shape. Therefore, a surface 11a of the support base 11 is structured in three-dimension according to the shape of the interior member to be placed.

Besides, the support base 11 provided in the airbag rupturing groove forming apparatus 10 in this embodiment is composed using nonmetal resin materials in order not to be an obstacle to detecting the metal blade 13 by the first and second metal blade detecting means 67 and 69 as mentioned later.

Further, in the case of the support base 11 in this embodiment being composed using metal material or metal containing nonmetal resin material, so as not to be an obstacle to detecting the metal blade 13 by the first and second metal blade detecting means 67 and 69 as mentioned later, holes penetrating the support base 11 are provided in predetermined places of the support base 11 which corresponds to positions of the first and second metal blade detecting means 67 and 69, and an electric insulation resin material (for example, epoxy resin and silicon resin) is injected in the holes while the first and second metal blade detecting means 67 and 69 are placed at the inside of the holes so that the first and second metal blade detecting means 67 and 69 are fixed and embedded in the holes.

Namely, according to the above constitution, the first and second metal blade detecting means 67 and 69 could detect the metal blade 13 even when the support base 11 is composed of metal material or metal containing nonmetal resin material because a portion composed of metal material or metal containing nonmetal resin material is not present in a surrounding surface of the first and second metal blade detecting means 67 and 69, and a region between the interior member fixed on the support base 11 and the first and second metal blade detecting means 67 and 69.

Also, the surface 11a of the support base 11 is provided with plural suction holes 17 and an aspiration device 18 which aspirates and fixes the interior member placed on the surface 11a through the suction holes 17. As for the aspiration device 18, for example, a vacuum pump could be used. It may be possible that a worker hold down the interior member. However, by providing such aspiration device 18, even an inner interior member having a complicated shape or a large shape could easily be fixed on the support base 11. Thus, the position gap of the interior member and unevenness in a remaining thickness of the airbag rupturing groove could be avoided when the airbag rupturing groove is formed, and it is enabled to form the airbag rupturing groove with high precision. Moreover, unlike a mechanically fixing method, it is enabled to easily change whether or not fixing the interior member by switching on or off operation of the aspiration device 18, and it is enabled to work quickly.

A rupturing groove forming means.

A rupturing groove forming means 33 is provided so that the metal blade 13 is protruded from the hard substrate layer into the vehicular interior member comprising the hard substrate layer, the skin layer and the foam layer, and so that the airbag rupturing groove reaching to the skin layer is to be formed. Since the interior member includes the hard substrate layer which is hard and large in strength, unlike the skin layer or the foam layer, it is required that the rupturing groove forming means 33 could easily cut such hard substrate layer. Also, the means is required that the formed rupturing groove is to be a narrow line width so that its good invisibility from a front surface side of the interior member could keep for a long period of time.

As for the rupturing groove forming means 33, a heat melt blade or an ultrasonic cutter, or the like could appropriately be used. In the airbag rupturing groove forming apparatus 10 in this embodiment, the rupturing groove forming means 33 is provided with the metal blade 13 and an ultrasonic cutter 33a having ultrasonic vibrator (not shown in figures.) which gives ultrasonic vibration to the metal blade 13. This ultrasonic cutter 33a is fixedly mounted to a rupturing groove forming means stationary part 63a within a movement control robot 63.

Figure 5:
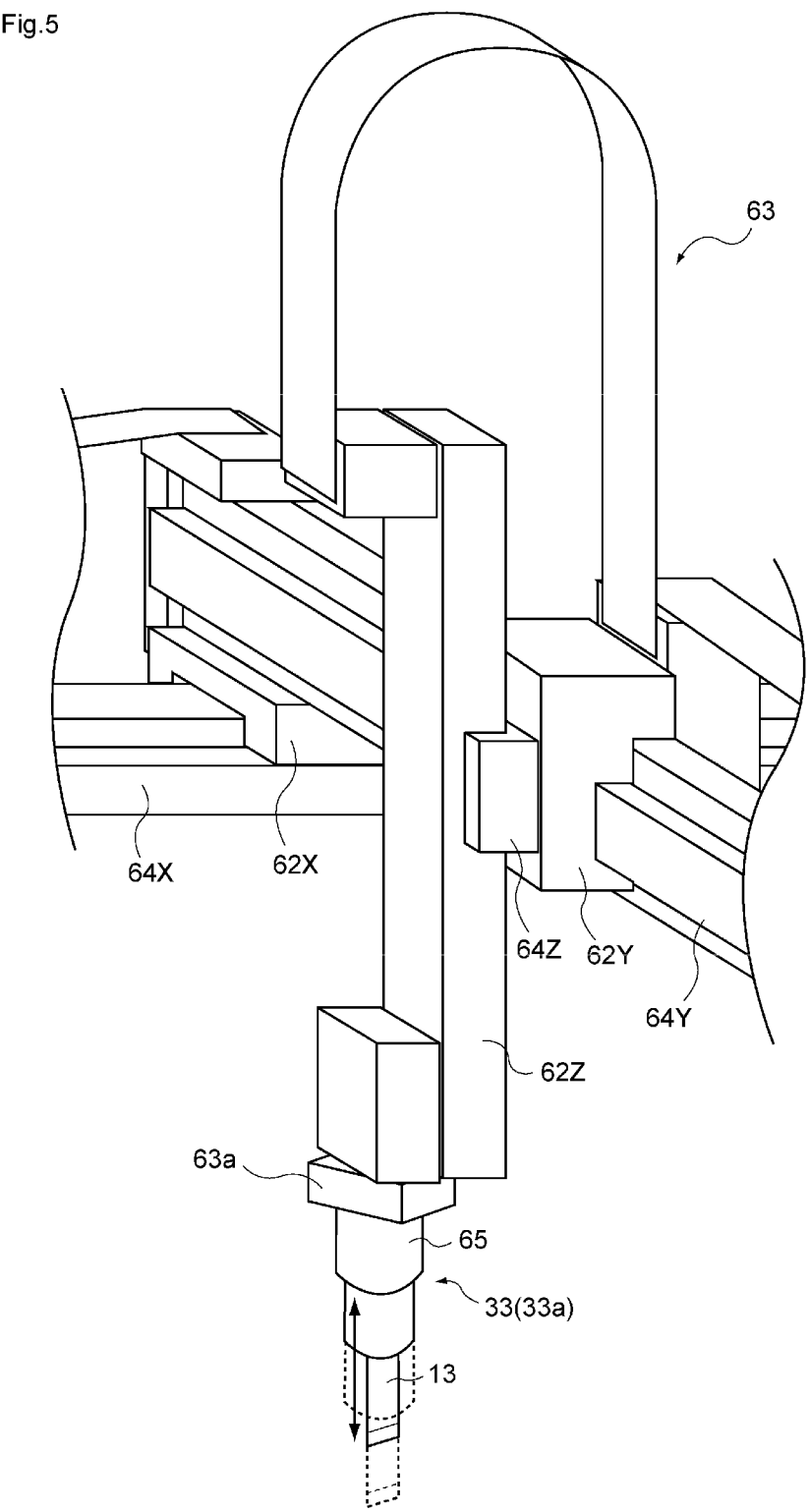
FIG. 5 is a figure showing structure of the rupturing groove forming means fixedly mounted in the movement control robot.

A magnified perspective view for the vicinity of the rupturing groove forming means stationary part 63a to which the rupturing groove forming means 33 is fixedly mounted, within the movement control robot 63, is shown FIG. 5. A cylinder arm 65 which is controllable in expanding and contracting is installed to the rupturing groove forming means stationary part 63a, and the ultrasonic cutter 33a is fixedly mounted to the cylinder arm 65.

As for the airbag rupturing groove forming apparatus 10 in this embodiment, the metal blade 13 used for the ultrasonic cutter 33a is formed like a plate and its blade edge is flattened against a forming face of the airbag rupturing groove. Therefore, when the metal blade 13 is protrudes into the interior member with supersonic vibration, the airbag rupturing groove could be easily formed at the place where the metal blade 13 is protruded.

The airbag rupturing groove formed using such platelike metal blade 13 basically forms a cutting-plane line having a comparatively narrow line width. Therefore, although the airbag rupturing groove is formed reaching to the back side of the skin layer which is disposed on an exterior surface of the interior member, its existence of the airbag rupturing groove is not recognized from outside, and its good invisibility keeps for a long period of time.

The movement control robot 63 shown in FIG. 3 and FIG. 4 is provided with a rail 64X, 64Y and 64Z, respectively, along X-axis, Y-axis and Z-axis, and is provided with a base plate 62X, 62Y and 62Z, respectively, which moves on the each rail. Each base plate 62X to 62Z moves on the corresponding rail 64X to 64Z by a control signal from a movement controller 16. Of these, a horizontal movement control means relating to flat direction, consists of the rails 64X and 64Y along X-axis and Y-axis, and the base plates 62X and 62Y. Also, a vertical movement control means relating to thickness direction, consists of the rail 64Z along Z-axis and the base plate 62Z. Of these, the rupturing groove forming means stationary part 63a is installed to the base plate 62Z moving on the rail 64Z placed along Z-axis direction, and the rupturing groove forming means stationary part 63a is rotatable with the rotating axis of Z-axis direction as the center.

A movement control of the movement control robot 63, a rotation control of the rupturing groove forming means stationary part 63a and an expanding and contracting control of two cylinder arms 65 are carried out by the movement controller 16 (See FIG. 3). Also, a patterned shape of the airbag rupturing groove to be formed is beforehand memorized in the movement controller 16. Thus, the movement controller 16 outputs a signal so that the rupturing groove forming means stationary part 63a of the movement control robot 63 is allowed to move in the X-axis and Y-axis direction (flat direction). Also, when the airbag rupturing groove is formed, in order to change a direction of the edge of the metal blade 13 along the direction of forming the airbag rupturing groove, a signal to rotate the rupturing groove forming means stationary part 63a is output, and it allows a cylinder arm 65 to expand or contract, and to move in direction of Z-axis (the direction of thickness). As the result, the metal blade 13 having the ultrasonic cutter 33a moves the position along this pattered shape and forms the airbag rupturing groove of a broken line. Besides, the depth of the airbag rupturing groove could be adjusted, by controlling the position in the Z-axis direction of the rupturing groove forming means stationary part 63a within the movement control robot 63.

Note that structure of the movement control robot for the rupturing groove forming means is not limited to the one described in FIG. 3 and FIG. 4, but various structure may be possible. As for another example of structure, an example having an arm robot may be possible.

A metal detecting means.

As shown in FIG. 3 and FIG. 4, in the rupturing groove forming apparatus 10 in this embodiment, the support base 11 is provided with a first metal blade detecting means 67 and a second metal blade detecting means 69, in order to detect a position of the edge of the metal blade 13 constituting the rupturing groove forming means 33.

The first metal blade detecting means 67 and the second metal blade detecting means 69 are disposed inside of the support base 11, and are adapted so that presence or absence of the metal blade 13 is detected in a particular detection position set beforehand. For example, as for the first metal blade detecting means 67 and the second metal blade detecting means 69, a metal detector could be used. It is comprised so that the metal blade 13 is detected when the metal blade arrived at the detection position, but if the metal blade 13 could be detected, a detecting means is not limited in particular.

Since the rupturing groove affects the deployment property of the airbag, management of the thickness of the remaining portion is important. In the rupturing groove forming apparatus 10 in this embodiment, it is structured, considering its invisibility, so that the rupturing groove is formed when the metal blade 13 is protruded into the skin layer disposed on an exterior surface of the interior member. In this embodiment, the thickness of the remaining portion is suitably managed by means of controlling the height position of the edge of the metal blade 13.

Figure 6A:
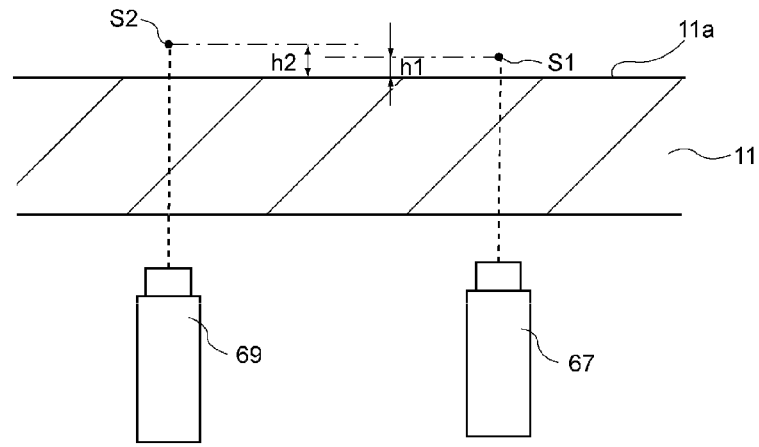
FIGS. 6A and 6B are figures showing the first metal blade detecting means and the second metal blade detecting means.
Figure 6B:
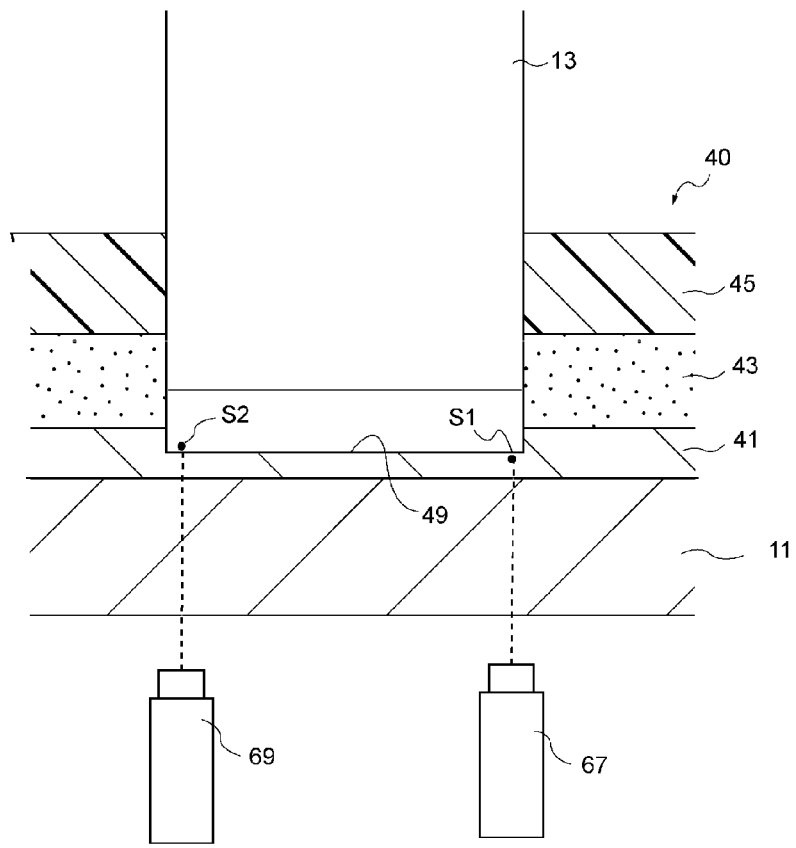

A sectional view of the support base 11 cutting along a form-scheduled line of the formed rupturing groove is shown in FIG. 6A, and a situation of forming the airbag rupturing groove 49 in the interior member 40 placed on the support base 11 is shown in FIG. 6B. Note that in FIGS. 6A and 6B, members relating to the suction hole and the aspiration device in the support base 11 are omitted.

As shown in FIGS. 6A and 6B, a first detection position S1 to be detected by the first metal blade detecting means 67 and a second detection position S2 to be detected by the second metal blade detecting means 69 are different in height in the direction of the thickness of the skin layer 41 where the airbag rupturing groove 49 is formed. The second detection position S2 is set to be higher and closer to the hard substrate layer 45. A height h1 of the first detection position S1 over a placing table 11a of the supporting base 11 is set at the minimum height position that is permitted as a remaining thin thickness of the airbag rupturing groove 49. On the contrary, a height h2 of the second detection position S2 over the placing table 11a of the support base 11 is set at the maximum height position that is permitted as a remaining thick thickness of the airbag rupturing groove 49. For example, the height of the first detection position S1 over the placing table 11a of the supporting base 11 is set to be a value within the range of 0.3 to 0.5 millimeter and the height of the second detection position S2 over the placing table 11a of the supporting base 11 is set to be a value within the range of 0.5 to 0.8 millimeter.

In the rupturing groove forming apparatus 10 in this embodiment, a signal detected by the first metal blade detecting means 67 or the second metal blade detecting means 69 is set to be sent to the movement controller 16 mentioned above. The amount of movement to the Z-axis direction of the movement control robot 63 where the metal blade 13 is fixedly mounted is controlled by feedback so that the metal blade 13 is detected by the second metal blade detecting means 69 while the metal blade 13 is not detected by the first metal blade detecting means 67. Hereby, the height position of the metal blade is adjusted so that the remaining thickness of the formed airbag rupturing groove 49 becomes within the desired range. That is, the movement controller 16 carries out functions as a blade edge position deciding unit and a blade edge position adjustment unit, as well.

Figure 7A:
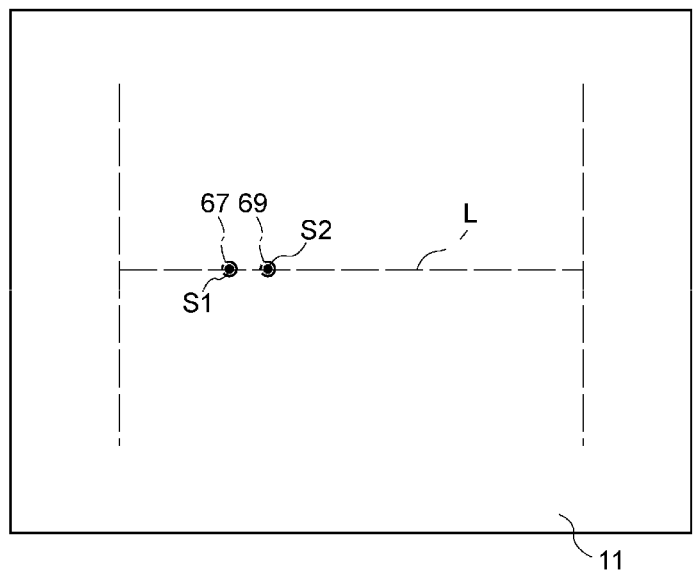
FIGS. 7A and 7B are figures showing dispositions of the first metal blade detecting means and the second metal blade detecting means.
Figure 7B:
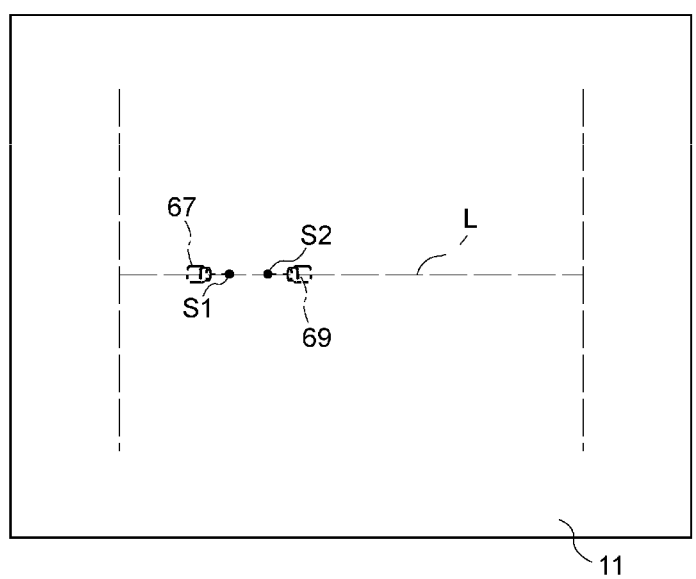

It is not limitation in particular about the placement position of the first metal blade detecting means 67 or the second metal blade detecting means 69. For example, as shown in FIG. 7A, it may be arranged in the position which overlaps with a form-scheduled line of the airbag rupturing groove L or its extended line, and which is right under each detecting position when the support base 11 is viewed from the upper part. Also, as shown in FIG. 7B, it may also be arranged in the position which overlaps with a form-scheduled line L of the airbag rupturing groove or its extended line, and which is moved from the right under each detecting position when the support base 11 is viewed from the upper part.

Figure 8A:
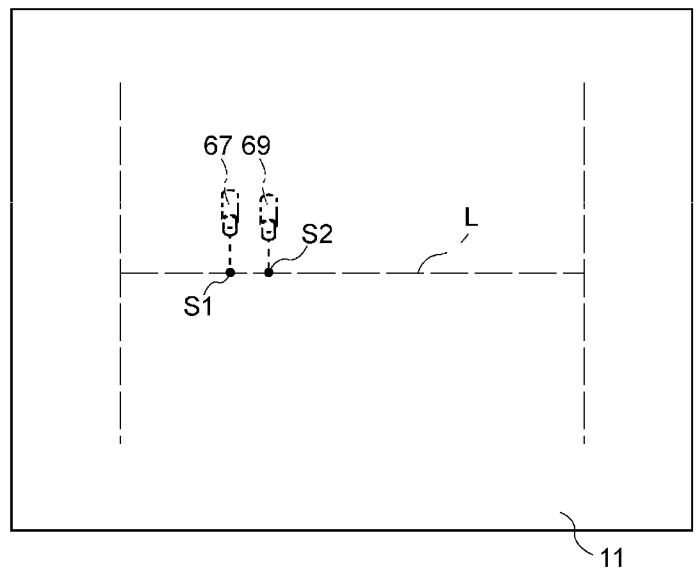
FIGS. 8A and 8B are figures showing other dispositions of the first metal blade detecting means and the second metal blade detecting means.
Figure 8B:
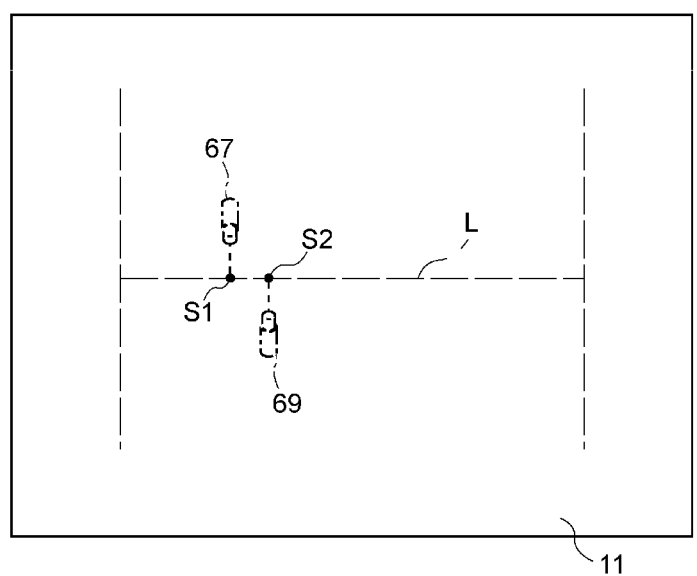

Furthermore, as shown in FIGS. 8A and 8B, the position of the first metal blade detecting means 67 and the second metal blade detecting means 69 could be arranged on either side of the form-scheduled line of the airbag rupturing groove L or its extended line, or on both sides of the line.

Also in the example shown in FIGS. 7 and 8, the first detecting position S1 and the second detecting position S2 are located on the form-scheduled line L of the airbag rupturing groove, and are located in different position in a plane. Since the edge of metal blade 13 is flattened, when an edge height of the metal blade retains in an appropriate position, it becomes possible that a metal blade is detected at the second detecting position S2 by the second metal blade detecting means 69 while a metal blade is not detected at the first detecting position S1 by the first metal blade detecting means 67.

Figure 9A:
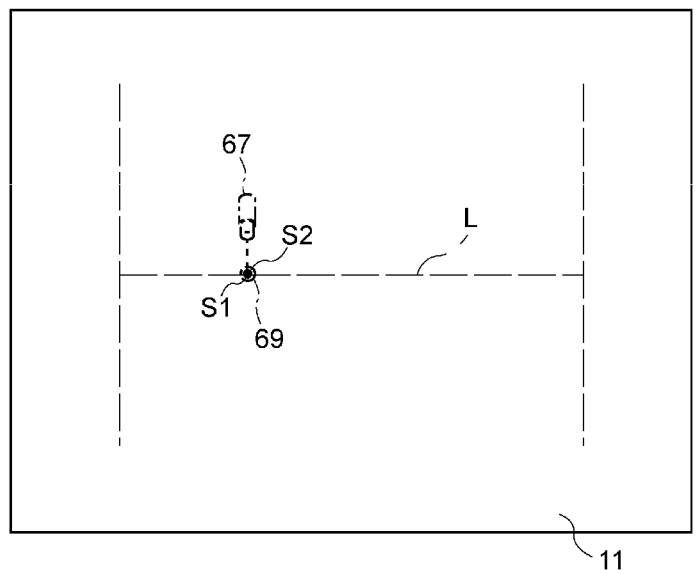
FIGS. 9A and 9B are figures showing still other dispositions of the first metal blade detecting means and the second metal blade detecting means.
Figure 9B:
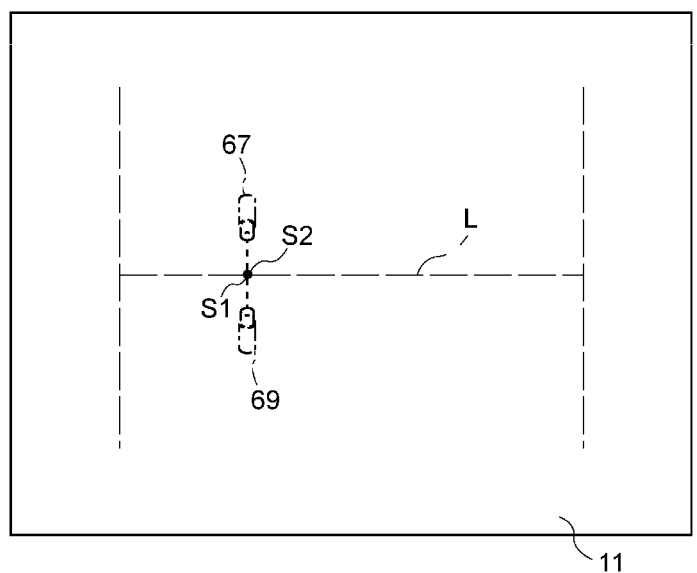

Note that in the present invention, as shown in FIGS. 9A and 9B, the first detection position S1 and the second detection position S2 could be arranged in the position on a form-scheduled line L of the airbag rupturing groove, and in the position which overlaps each other in the plane.

Figure 10:
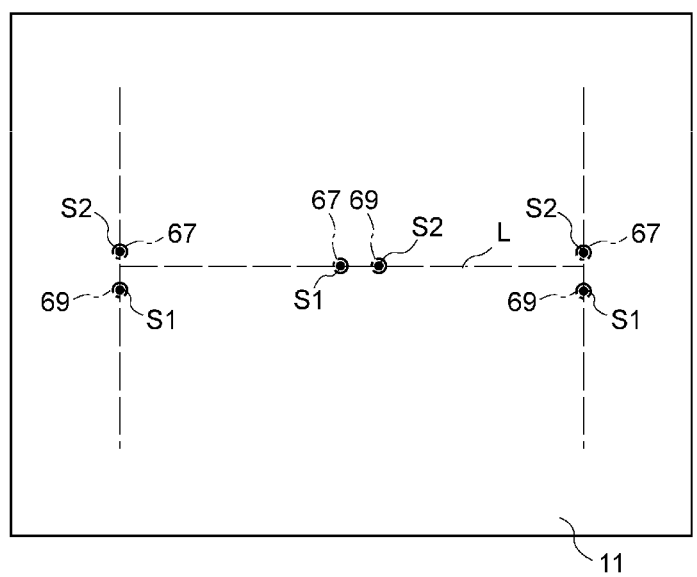
FIG. 10 is a figure showing disposition examples of two or more first metal blade detecting means and the second metal blade detecting means.

As for the first metal blade detecting means 67 or the second metal blade detecting means 69, it may be possible that both or at least either of these comprise two or more means. That is, the rupturing groove forming apparatus 10 in this embodiment, the metal blade 13 having the ultrasonic cutter 33a is protruded multiple times while changing the position to the interior member and forms airbag rupturing grooves of a broken line shape. It could also be configured so that its edge height of the metal blade 13 is judged at plural positions. For example, as mentioned above, when the rupturing groove is formed in such a way as only part of the rupturing groove reaches to the skin layer, it is preferred that the first metal blade detecting means 67 and the second metal blade detecting means 69 are disposed, respectively, at the position where the rupturing groove reaches to the skin layer as shown in FIG. 10. By disposing in this way, since the edge height of the metal blade could be detected at the each position where the rupturing groove reaches to the skin layer, it could be judged whether or not a remaining thickness of the airbag rupturing groove at each position is appropriately formed.

Also, it is preferred that an eddy-current displacement sensor is used as for the first metal blade detecting means 67 and the second metal blade detecting means 69.

The reason is that, in the case of such an eddy-current displacement sensor, there is no need to measure a distance of the edge of the metal blade 13 from the first metal blade detecting means 67 and the second metal blade detecting means 69, since in the present invention, the depth of the airbag rupturing groove could be adjusted by detecting presence or absence of the metal blade 13 in the detection position set beforehand. Thus, in the case of such an eddy-current displacement sensor, the position of the edge of the metal blade could be confirmed even though the eddy current is not stably formed.

Therefore, in the case of such an eddy-current displacement sensor, the position of the edge of the metal blade 13 could be confirmed in a moment (0.1 sec or less) without stopping the metal blade 13, and a working speed of manufacturing the airbag rupturing groove is 300 mm/sec or more.

A metal blade edge status detecting means.

Also, a metal blade edge status detecting means 29 as shown in FIG. 3 and FIG. 4, is a means to detect whether or not there is abrasion or damage in the edge of the metal blade 13. It measure the status of the edge of the metal blade 13, and when status of the damage owing to abrasion or the like is detected, the apparatus could be stopped the operation, and the metal blade could be changed. Consequently, a remaining thickness of the airbag rupturing groove could be adjusted with high precision.

Specifically, the metal blade edge status detecting means 29 is constituted using a laser measuring device or infrared measuring device, or the like. The metal blade edge status detecting means 29 could detect a degree of damage owing to abrasion or the like, by measuring a difference in the edge height between before forming the rupturing groove and after having formed the rupturing groove or by measuring the shade shape of the metal blade, by means of putting the metal blade 13 at the height of a metal blade edge status detecting means 29 position, while keeping a tip of the movement control robot 63 at the height determined beforehand.

By providing such metal blade edge status detecting means 29, it is enabled that a distance between the edge of the metal blade 13 and the placing table 11a in the support base 11 could be maintained in constant state, considering blade status of the metal blade 13. As the result, although a kind, thickness or the like of the skin layer, is changed, the airbag rupturing groove having uniform overall remaining thickness could be quickly formed with high precision.

Next, a manufacturing method of the vehicular interior member in a second embodiment will be described with referring to examples of a manufacturing method of the interior member, which includes the process for forming the airbag rupturing groove in the interior member using the airbag rupturing groove forming apparatus in the first embodiment.

First of all, the vehicular interior member which becomes an object of forming the airbag rupturing groove is prepared. As shown in FIG. 1, the interior member in this embodiment is a three-layer-structured interior member 40, and comprises the hard substrate layer 45, the skin layer 41 which covers the external surface of the hard substrate layer 45 and the foam layer 43 between the hard substrate layer 45 and the skin layer 41.

In the case of such a three-layer-structured interior member 40, comprising for example, the hard substrate layer 45, the foam layer 43 and the skin layer 41, it could be manufactured as follow. First, both a half body of a mold which is in a state of retaining the hard substrate layer 45 formed by injection molding and a half body of a mold which in a state of retaining the skin layer 41 formed by powder slash molding are formed. Then, two half bodies are piled up so that space is formed between the hard substrate layer 45 and the skin layer 41. Lastly, foam material is filled up in the space in order to form the foam layer. In another example, it could be manufactured after forming both a half body of a mold which is in a state of retaining the hard substrate layer 45 formed by injection molding and a half body of another mold, two half bodies are piled up so that space is formed at the front surface side of the hard substrate layer 45. Then, resin material is filled up in the formed space, and on the one hand the skin layer 41 is formed quickly by solidifying the part contacting the molds, and the other hand the foam layer 43 is formed by foaming the other middle part. That is, the skin layer 41 and the foam layer 43 could be formed using different materials in different processes, or the skin layer 41 and the foam layer 43 could be formed from the same material in the same process.

Next, the processed interior member 40 is put down on the placing table 11*a* in the support base 11, with the skin layer 41 downside, that is, the hard substrate layer 45 upside. Although there is no figure to be shown, after the interior member 40 is placed there, the interior member 40 is fixed by aspirating through the suction hole by operating aspiration means such as a vacuum pump or the like.

Figure 11A:
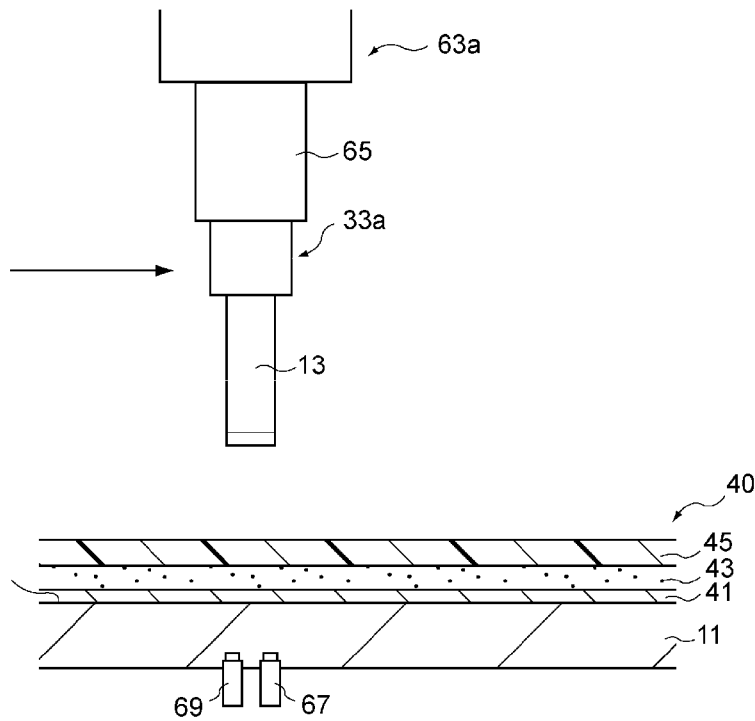
FIGS. 11A and 11B are figures showing an airbag rupturing groove forming process in the interior member manufacturing method in the second embodiment of the present invention.
Figure 11B:
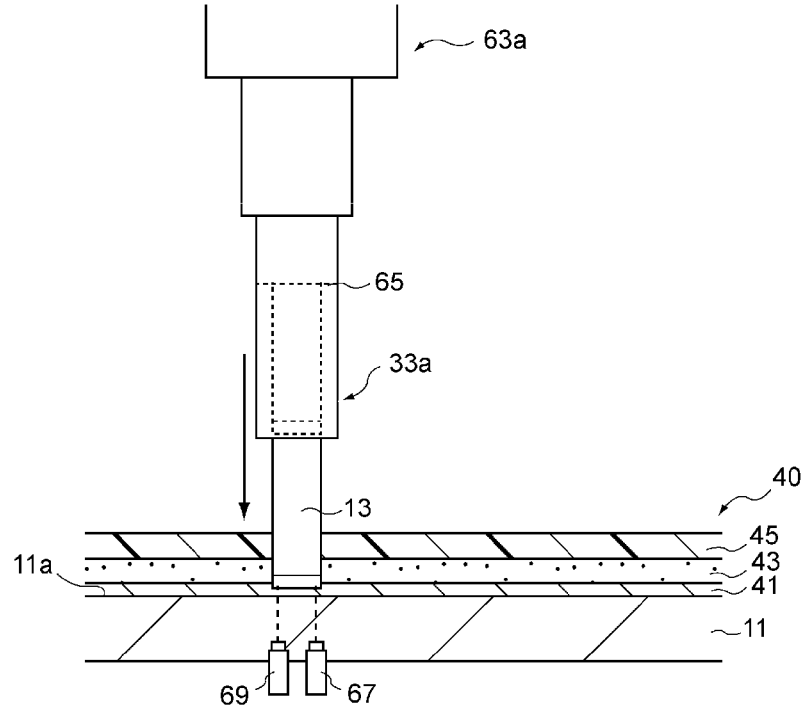

Next, as shown in FIG. 11A, the rupturing groove forming means stationary part 63*a* is moved to the position where the metal blade 13 having the ultrasonic cutter 33*a* is protruded, by a planar orientation movement means within the movement control robot 63. Then, as shown in FIG. 11B, by allowing the metal blade 13 to go down by a thickness orientation movement means within the movement control robot 63, the metal blade 13 is protruded into the interior member 40 so that a predetermined remaining thickness forms, resulting in forming a rupturing groove 49*a* which becomes a part of an airbag rupturing groove.

At this situation in this embodiment, in order to form a predetermined remaining thickness in the skin layer 41, the amount of protrusion by the metal blade 13 is controlled by feedback so that the edge of the metal blade 13 retains at a predetermined height, based on detecting signals from the first metal blade detecting means 67 and second metal blade detecting means 69. That is, the airbag rupturing groove 49 is formed adjusting the amount of protrusion by the metal blade 13, so that the metal blade 13 is not detected by the first metal blade detecting means 67 while the metal blade 13 is detected by the second metal blade detecting means 69. Consequently, even when the distance between the rupturing groove forming means stationary part 63*a* and the edge of the metal blade 13 is changed owing to unevenness in metal blade length or abrasion of the blade edge or the like, it is enabled to appropriately manage the remaining thickness.

The remaining thickness of the airbag rupturing groove is adjusted, for example, to be around 0.5 millimeteres. Specifically, in case both the first metal blade detecting means 67 and the second metal blade detecting means 69 detect the metal blade 13, it is corrected so that an amount of protrusion of the metal blade 13 by the movement control robot 63 becomes small. On the contrary, in case neither the first metal blade detecting means 67 nor the second metal blade detecting means 69 detects the metal blade 13, it is corrected so that an amount of protrusion of the metal blade 13 by the movement control robot 63 becomes large.

Figure 12A:
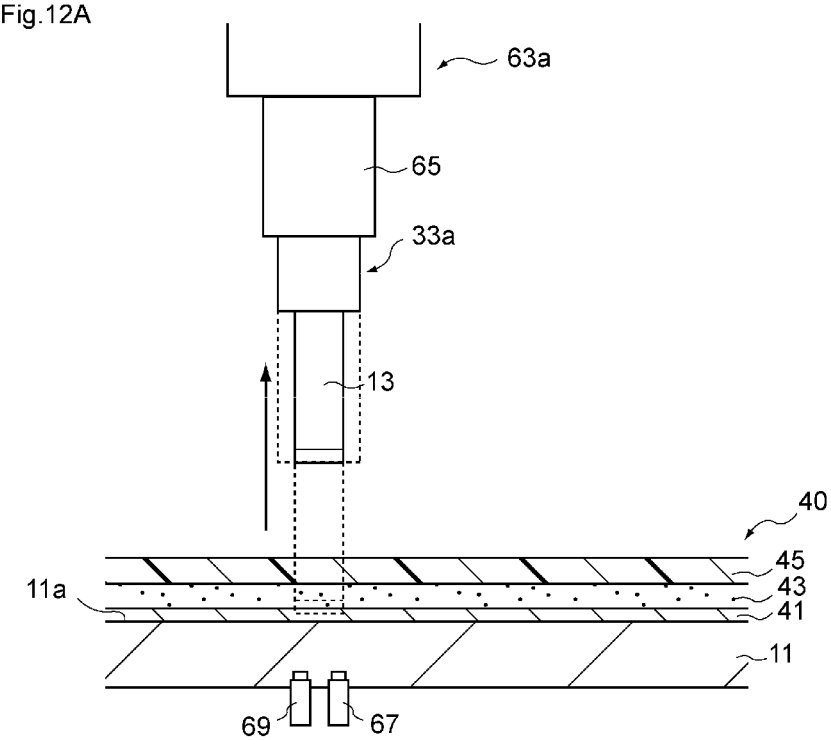
FIGS. 12A and 12B are figures showing an airbag rupturing groove forming process in the interior member manufacturing method in the second embodiment of the present invention.
Figure 12B:
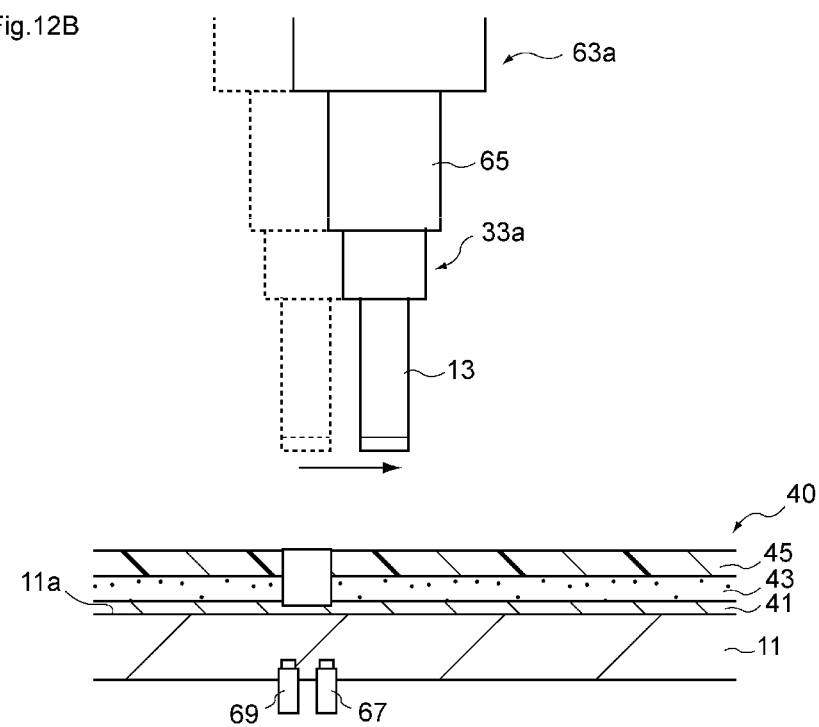

Next, after allowing the metal blade 13 to rise and set apart from the interior member 40, by the thickness orientation movement means as shown in FIG. 12A, the rupturing groove forming means stationary part 63*a* is allowed to move to the location where the next rupturing groove is formed, by the planar orientation movement means, as shown in FIG. 12B. Then the airbag rupturing groove is formed in the same way as described referring to FIG. 11B. Since an airbag rupturing groove of a broken line is set to form in this embodiment, the airbag rupturing groove is formed when repeatedly carrying out upward and downward movement and plane orientation movement by the movement control robot 63.

However, it is not necessary to detect the edge of metal blade 13 in all processes where the metal blade 13 is protruded into the interior member. It is rather preferred to measure at least once for each span when the airbag rupturing groove comprises plural spans.

Figure 13:
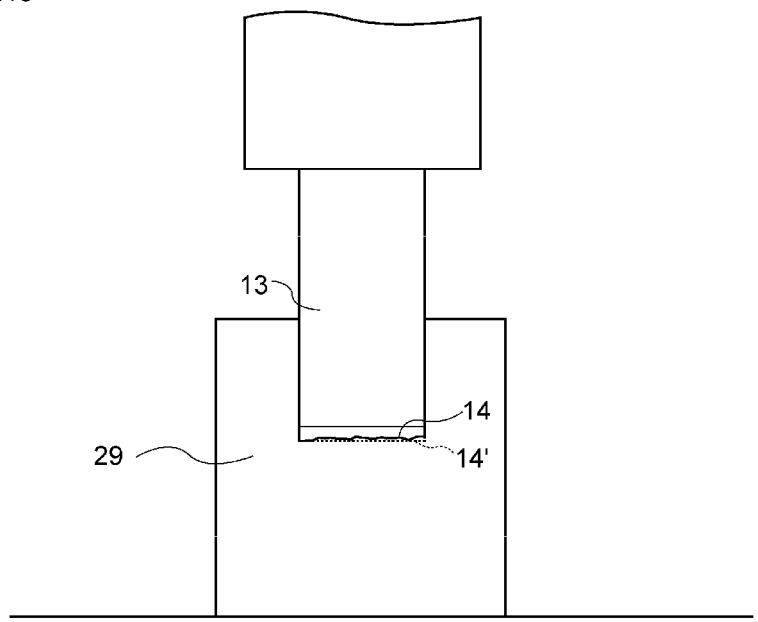
FIG. 13 is a figure showing a process for inspecting the edge status of the metal blade in the interior member manufacturing method in the second embodiment of the present invention.

After all airbag rupturing grooves are formed in such way, the rupturing groove forming means stationary part 63*a* of the movement control robot 63 is moved and a status of the blade edge 14 of the metal blade 13 is inspected by the metal blade edge status detecting means 29, as shown in FIG. 13. For example, the metal blade 13 is given back to the position of a predetermined height h1, and the degree of damages owing to abrasion or the like is inspected, by comparing shades between an actual blade edge 14 and an ideal blade edge 14' of the metal blade 13, by means of a laser measuring device or an infrared measuring device or the like. Thus, by inspecting the status of the metal blade 13 in this way, it is enabled to more exactly control the metal blade 13 at the next time for forming an airbag rupturing groove. Besides, by inspecting the status of the metal blade 13 after having formed the airbag rupturing groove, when damages is detected in the blade edge, it is possible to stop the apparatus and change the blades.

Note that as for detecting a status of the blade edge of the metal blade, it is also possible to carry out immediately before forming the airbag rupturing groove.

The basic structure in the third embodiment of the present invention is similar to the airbag rupturing groove forming apparatus described in the first embodiment. However, as opposed to being configured so that the airbag rupturing groove forming apparatus 10 described in the first embodiment forms the airbag rupturing groove by carrying out repeatedly in a planar orientation movement and a thickness orientation movement of the metal blade, the airbag rupturing groove forming apparatus 10 in this embodiment is configured so that the metal blade has a blade surface in plane shape similar to the plane pattern of the airbag rupturing groove and the metal blade is protruded only once into the interior member to form the airbag rupturing groove.

The points different from the first embodiment will be mainly described in the following.

Figure 14:
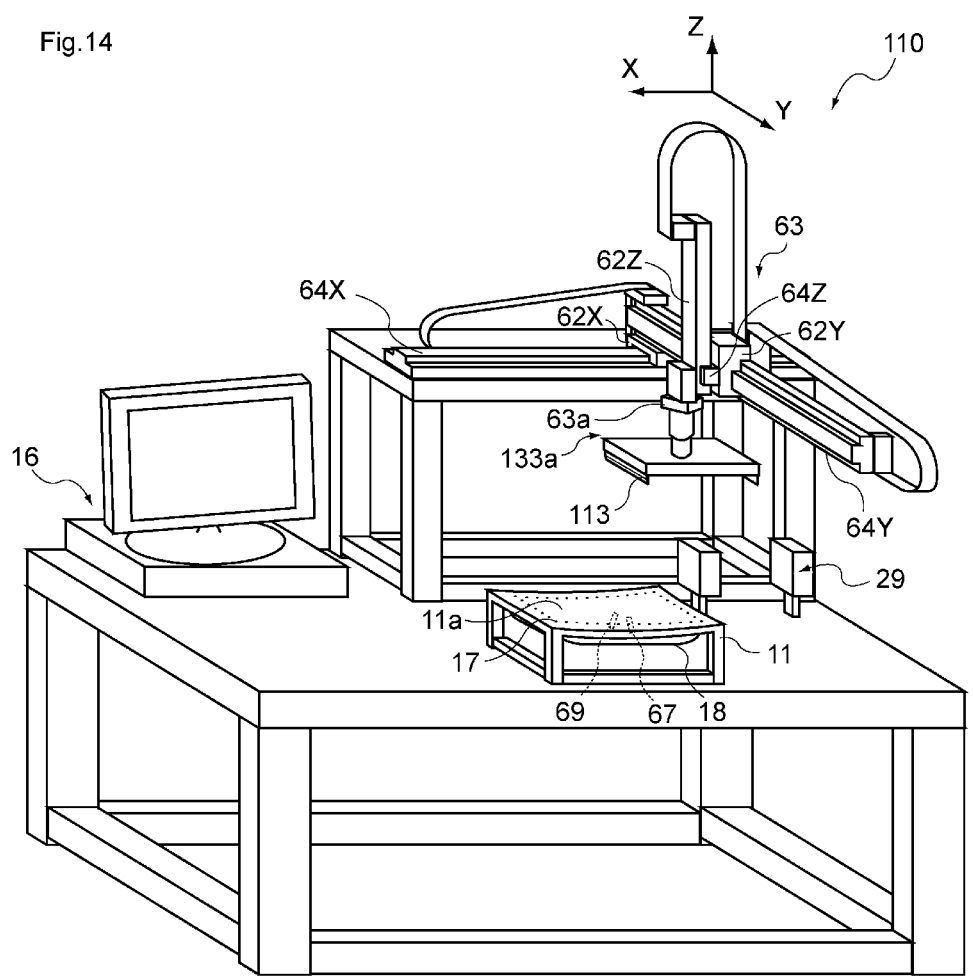
FIG. 14 is a perspective view showing the configuration of the airbag rupturing groove forming apparatus in the third embodiment of the present invention.
Figure 15A:
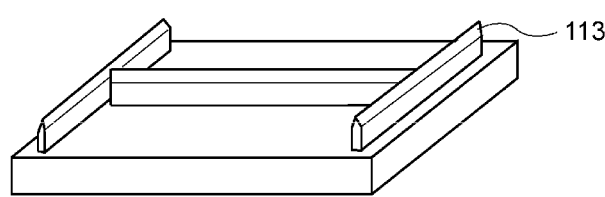
FIGS. 15A and 15B are figures showing structure of the metal blade provided in the airbag rupturing groove forming apparatus in the third embodiment of the present invention.
Figure 15B:
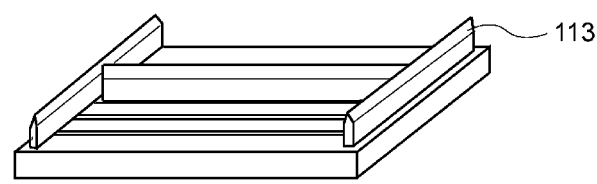

A perspective view showing a configuration example in this embodiment for the airbag rupturing groove forming apparatus 110 is shown in FIG. 14. FIG. 15 shows examples of a metal blade 113 provided when an airbag rupturing groove shown in FIG. 2A is formed. Except the metal blade 113 having an ultrasonic cutter 133*a*, an airbag rupturing groove forming apparatus 110 is basically the same as the airbag rupturing groove forming apparatus 10 as shown in FIGS. 3 and 4, and the same code is used for the same portion of the configuration.

As mentioned above, the metal blade 113 used for the airbag rupturing groove forming apparatus 110 has a blade surface in plane shape similar to the plane pattern of the airbag rupturing groove to be formed. Therefore, in the airbag rupturing groove forming apparatus 110 in this embodiment, after the metal blade 113 is set position by the planar orientation movement means, the airbag rupturing groove is to be formed by only one action, by allowing the metal blade 113 to be protruded with giving ultrasonic into the interior member 40, by the thickness orientation movement means.

The airbag rupturing groove forming apparatus is provided with at least one pair or more of the first metal blade detecting means 67 and the second metal blade detecting means 69, in which the first detection position S1 and the second detection position S2 are set to overlap with a form-scheduled line of the airbag rupturing groove. Thus, the blade edge of the metal blade 113 is detected whether or not it is within a desired range, in the state that the metal blade is kept protruded into the interior member 40. Consequently, the remaining thickness of the formed airbag rupturing groove is appropriately managed whether or not it is within the desired range.

What is claimed is:

1. A manufacturing method of a vehicular interior member having a hard substrate layer at a back side of the vehicular interior member, a skin layer to cover an exterior surface of said hard substrate layer, and an airbag rupturing groove formed in the vehicular interior member and configured to break during deployment of an airbag, wherein said airbag rupturing groove is formed by:

providing a metal blade having flattened edge, protruding the edge of the metal blade from the back side of said vehicular interior member through the hard substrate layer and partially into said skin layer to form the rupturing groove, wherein a thickness of said skin layer into which said metal blade has not protruded corresponds to a remaining thickness of said skin layer, using a first eddy-current displacement sensor for confirming whether said metal blade is not detected at a first detecting position that corresponds to a minimum permissible value that is permitted as said remaining thickness of said skin layer, using a second eddy-current displacement sensor for confirming whether or not said metal blade is detected at a second detecting position that corresponds to a maximum permissible value that is permitted as said remaining thickness of said skin layer, wherein the first detecting position and the second detecting position are located at different positions in a thickness direction of said skin layer, and adjusting a height of the metal blade if the metal blade is not detected at both the first and second detecting positions or if the metal blade is detected at both the first and second detecting positions so that the metal blade achieves a specified height to be detected by the second eddy-current displacement sensor at the second detecting position and so as not to be detected by the first eddy-current displacement sensor at the first detecting position.

2. The method of claim 1, wherein the step of adjusting a height of the metal blade is carried out so that a penetration amount of the metal blade into the skin layer is decreased if the first eddy-current displacement sensor detects the metal blade at the first detecting position and if in the second eddy-current displacement sensor detects the metal blade at the second detecting position.

3. The method of claim 1, wherein the step of adjusting a height of the metal blade is carried out so that a penetration amount of the metal blade into the skin layer is increased if the first eddy-current displacement sensor does not detect the metal blade at the first detecting position and if in the second eddy-current displacement sensor does not detect the metal blade at the second detecting position.

4. The manufacturing method of claim 1, wherein the eddy-current displacement sensors are operated to detect the position of the metal blade without stopping protruding operations of the metal blade.

5. The manufacturing method of claim 4, wherein the eddy-current displacement sensors are operated to detect the position of the metal blade while moving the metal blade at a processing speed of at least 300 mm/sec.

6. The manufacturing method of claim 1 further comprising comparing an actual shape of the edge of the metal blade to an ideal shape of the edge of the metal blade after forming the airbag rupturing groove to determine whether the metal blade requires replacement.

* * * * *